US010642910B2

(12) United States Patent
Weisner et al.

(10) Patent No.: US 10,642,910 B2
(45) Date of Patent: *May 5, 2020

(54) ACCUMULATION OF LOCATION HISTORY BASED ON DIGITAL MEMBER ENTRIES FROM MULTIPLE DEVICES OF A MOBILE WEB

(71) Applicants: Sholem Weisner, New York, NY (US); Shmuel Nemanov, New York, NY (US)

(72) Inventors: Sholem Weisner, New York, NY (US); Shmuel Nemanov, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/563,977

(22) Filed: Sep. 9, 2019

(65) Prior Publication Data
US 2020/0034392 A1    Jan. 30, 2020

Related U.S. Application Data

(63) Continuation of application No. 16/527,037, filed on Jul. 31, 2019, now Pat. No. 10,565,270, which is a continuation of application No. 16/175,880, filed on Oct. 31, 2018, now Pat. No. 10,394,906, which is a continuation of application No. 11/811,165, filed on Jun. 7, 2007, now Pat. No. 10,146,871, which is a
(Continued)

(51) Int. Cl.
*G06F 16/951*    (2019.01)
*G06Q 30/02*    (2012.01)

(52) U.S. Cl.
CPC ........... *G06F 16/951* (2019.01); *G06Q 30/02* (2013.01)

(58) Field of Classification Search
CPC ..................................................... G06F 16/951
USPC ......................................... 709/203, 204, 217
See application file for complete search history.

(56) References Cited

U.S. PATENT DOCUMENTS 6,321,158 B1    11/2001    DeLorme
6,442,263 B1    8/2002    Beaton
(Continued)

OTHER PUBLICATIONS

Aalto, K., Gothlin,N., Korhonen, J. and Ojala, T. Bluetooth and WAP Push based location-Aware Mobile Advertising System:, MobiSys '04, Jun. 6-9, 2004, Boston, Mass., USA.

*Primary Examiner* — Jason D Recek
(74) *Attorney, Agent, or Firm* — Mark M. Friedman

(57) ABSTRACT

A personalized way to digitally record a person's physical activities over time serves web searching, business advertising, nostalgia, security and object tracing purposes. The chronological digital history of the person's physical presence over a time includes (i) digital network entries from other members who hold their portable wireless short range device near the person's device and transmit a URL or other key data and (ii) digital member entries such a digital photograph of a store sign. The digital network entries and digital member entries are automatically transmitted to a database located on a telecommunications network at a time of entry. Advertisers can transmit to members when members enter premises of advertiser's store. Upon sign-up online, the authentication data uniquely associated with an account is provided and key data they want to transmit is associated with the account. Digital histories can be used to improve web searching and networking opportunities.

29 Claims, 10 Drawing Sheets

Related U.S. Application Data continuation-in-part of application No. 11/729,798, filed on Mar. 27, 2007.

(56) References Cited

U.S. PATENT DOCUMENTS

| | | | |
|---|---|---|---|
| 6,701,343 B1 * | 3/2004 | Kenyon | G06F 16/958 709/204 |
| 6,832,218 B1 | 12/2004 | Emens et al. | |
| 6,976,032 B1 | 12/2005 | Hull | |
| 6,998,985 B2 | 2/2006 | Reisman | |
| 7,191,220 B2 | 3/2007 | Ohwa | |
| 7,693,752 B2 | 4/2010 | Jaramillo | |
| 8,086,605 B2 | 12/2011 | Xu et al. | |
| 8,122,013 B1 | 2/2012 | Qian et al. | |
| 8,566,602 B2 | 10/2013 | Aaron | |
| 9,456,051 B2 | 9/2016 | Aaron | |
| 2001/0039546 A1 | 11/2001 | Moore | |
| 2002/0103865 A1 | 8/2002 | Lilly | |
| 2002/0128905 A1 | 9/2002 | Gillman | |
| 2003/0060212 A1 | 3/2003 | Thomas | |
| 2004/0102931 A1 * | 5/2004 | Ellis | A61B 5/1038 702/188 |
| 2004/0248569 A1 | 12/2004 | Kondou | |
| 2005/0038876 A1 | 2/2005 | Chaudhuri | |
| 2005/0043990 A1 | 2/2005 | Powers | |
| 2005/0073443 A1 | 4/2005 | Sheha | |
| 2005/0075119 A1 | 4/2005 | Sheha et al. | |
| 2005/0085188 A1 | 4/2005 | Ishii et al. | |
| 2005/0102233 A1 | 5/2005 | Park et al. | |
| 2005/0136949 A1 | 6/2005 | Barnes | |
| 2006/0036960 A1 | 2/2006 | Loui | |
| 2006/0039030 A1 | 2/2006 | Peterschmidt | |
| 2006/0071798 A1 | 4/2006 | Kiff et al. | |
| 2006/0085347 A1 | 4/2006 | Yiachos | |
| 2006/0090067 A1 | 4/2006 | Edmonds | |
| 2006/0220879 A1 | 10/2006 | Chan | |
| 2007/0008321 A1 | 1/2007 | Gallagher | |
| 2007/0156446 A1 | 7/2007 | Jolly | |
| 2007/0179356 A1 | 8/2007 | Wessel | |
| 2008/0010131 A1 | 1/2008 | Bridges | |
| 2008/0083825 A1 | 4/2008 | Yang et al. | |
| 2008/0117202 A1 | 5/2008 | Martinez | |
| 2008/0182588 A1 | 7/2008 | Aaron | |
| 2008/0248815 A1 | 10/2008 | Busch | |

\* cited by examiner

ACCUMULATION OF LOCATION HISTORY BASED ON DIGITAL MEMBER ENTRIES FROM MULTIPLE DEVICES OF A MOBILE WEB

FIELD OF THE INVENTION

The field of the present invention is the accumulation of a digital record of a person's physical presence across time, i.e. a "leg history", and more particularly, such a digital leg history that includes data from members of a network as well as data from images obtained unilaterally by the person.

BACKGROUND OF THE INVENTION AND DISCUSSION OF THE PRIOR ART

When a person/user surfs the world wide web, the user's browser maintains a surf history. For example, AOL® has an arrow next to the URL window that when clicked opens up a drop-down menu of previously visited web sites. Internet Explorer® has a more extensive search history feature that allows you to see all sites visited by someone at the computer on a certain date as well as a list of the most visited sites. It allows the user to search the list of sites. These surf histories or lists of previously visited web sites are lists of places that exist only in cyberspace and which the user has visited. Also, often the sites visited are gigantic sites that tens of millions of people visit per day or week and hence do not characterize the life of the person very much. Knowing that a person visited google.com no more tells you about that person's personality, life, uniqueness than would knowing that the person passed through a major intersection in Manhattan. Consequently, surf history lists cannot be said to meaningfully characterize the life of the user during a particular period of time. It could not provide a person reviewing their own history with the satisfaction, nostalgia and practical value associated with a digital leg history that meaningfully characterizes that person's life and past physical activities.

Some of the data that a person may wish to include in his digital leg history is data that exists handily on the electronic transmission device of another person he encounters and concerns that other person. There are also known methods of transferring data objects between portable electronic devices using short-range wireless communication methods, such as described in United States Patent Application Publication No. US 2005/0085188 to Ishii et al. entitled Method for Transferring Data Objects Between Portable Devices. The prior art, however, does not disclose using such transmission in the context of an overall digital leg history, especially not in the manner described more fully below.

Although there also exists various ways of recording events in one's life in digital form, see, e.g., U.S. Patent Application Publication No. US 2007/0008321 to Gallagher et al. entitled Identifying Collection Images With Special Events, the prior art does not teach the idea of a digital leg history with the characteristics and advantages described more fully below.

In addition, it is believed that in the not too distant future the distinction between business and individuals may be blurred since everyone will have a URL. This will also blur the distinction between advertisements and URLs since a person or business will be able to simply point a person to its or their URL and the web site located there will function as an advertisement There is compelling need to have data on the location and activities, past and present, of individuals. Such monitoring for security and police purposes raises "big brother" concerns. Even if such concerns can be met in various ways, empirically people may be severely reluctant to voluntarily submit to such monitoring unless the ability to monitor arose out of natural activities that people enjoyed doing. Accordingly, it is very useful to be able to have a digital leg history that people can use to sit back and review their life history in a novel and interesting way. Furthermore, such a digital leg history would thereby provide a way for security to be enhanced. The security needs of the public are often compelling, particularly since the advent of the global war on terror.

As an adjunct to the need to need to have data on the location and activities, past and present, of individuals and businesses, there is also a related need to have such data on the time and place of data transmissions or transfers.

Another basic need among businesses in society is advertising. Businesses are always looking for new venues in which to advertise. When use of the Internet became commonplace in the late 1990's business advertising on the Internet exploded. A digital leg history that is attractive to users would provide a new venue for businesses to advertise in.

Another problem unrelated to the above, and one that aggravates people, is finding their own possessions after such possessions have been seemingly lost. A person could buy something in a store, go to a doctor's appointment, meet a friend etc. over a period of hours and then realize that they lost an object that they were carrying or a valuable possession and do not have an easy way to figure out where it could be. If they had a clear log of where they had been and when and which people they had met during a defined time interval it would be easier to find lost objects. If the generating of such a log were not time-consuming on the part of the person generating it, it would be particularly useful.

Accordingly, there is a need to have a digital record of a person's past—where they have been physically—that includes people or places that they met that they consider significant enough to record for later use—as well as data transmitted from other members of a network including friends and including business members interested in advertising. There is a need to have such a log whose entries would automatically be transmitted to a database on the Internet. There is a further need to have a digital leg history that is appealing to review, including but not limited to reasons of nostalgia, that can be used to promote public security, that can provide a new venue for business advertisement and that can help track and ultimately find lost objects.

Another problem is that the world wide web and Internet in general have become dominated by large entities such as Google®. It is fair to say that while the Internet and world wide web has successfully connected everyone to everyone else, and this has provided new and great opportunities for smaller business and individuals, it is still fair to say that the world wide web, and in particular the process of searching the world wide web, has become dominated by a few large businesses. There is a need to allow smaller businesses and entities to feature more heavily in importance during web searching. Furthermore, it is fair to say that the process of searching the world wide web does not adequately take cognizance of the unique characteristics and tastes of the searching person. There is therefore a further need to allow web searching to better take cognizance of the unique tastes and characteristics of the searching person.

SUMMARY OF THE PRESENT INVENTION

Although accumulated electronically, the present invention is a viewable and updateable digital leg history conveying various kinds of information about where a person has physically been stretching back a day, a month, a year of many years. The entries represent various kinds of data that a person obtained at different points in time. The types of data can be data about the place he is in. It can be data concerning the person he met. It can be data concerning a business he visited. It can be data that another person he met thought was interesting. The data characterizing a place he was at can be in any sensory form. The data concerning people and businesses he met can be contact information, URLs, advertisements or another data. In some case, the people that the person encountered were members of the same network that the person signed up for to obtain this digital history. In other cases, the "people" are businesses that are interested to providing URLs, contact information or advertisements that will sit in the person's digital leg history and be viewed whenever the person looks at their leg history.

The data captured along the trail of a person's daily encounters are transmitted or entered electronically and stored in that person's hand-held electronic device. The data is also simultaneously sent to an online database holding that person's digital leg history.

A prerequisite of the system is that a manufacturer of electronic devices, i.e. cell phones, will have agreed to install special software 89 into the cell phone or other electronic device allowing it to upload data to a database on the web and to receive and transmit to other such electronic devices preferably using short range wireless communication methods, for example Bluetooth®.

Customers of the system of the present invention then sign up at a web site for a fee and obtain an account with the system. They thereby obtain data receiving privileges. In certain preferred embodiments, they also thereby obtain limited data transmitting privileges, in that they can transmit a URL or an electronic business card to another member of the system. If they want more extensive data transmitting privileges, they pay more under a separate package. In either case, they provide a digital copy of the data that they want to have stored in their cell phone to be transmitted to others. The data can be a business card, a URL, or, under the more extensive data transmitting package a song they like or an insight into a topic they are studying or anything else.

Signing up requires identifying the particular electronic device with its serial number. The system recognizes that device's right to upload information to the account/databank and the system will also transmit the data that the accountholder wanted to transmit to others to the device.

As an individual goes through his day, he may encounter people at meetings that he considers significant enough to record in his leg history. If the two individuals are both members of the system they each take out their cell phones and place them in reasonable proximity to one another. The receiving individual first pushes a button on his or her cell phone to put the receiving person's phone in receiving mode. Then the transmitting person pushes a button on his or her cell phone causing the data of the transmitter/sender to be transmitted to the receiver's cell phone. The receiving individual then pushes the same button on his communication device that he pushed before, in order to now store and "accept" the data. In a preferred embodiment, when the data first goes from the system's web site to the transmitter's cell phone the data is "coded" so that when the transmitter later transmits it to a recipient, the recipient cannot re-transmit that sender's data to another member of the network even if the recipient attains or has transmitting privileges That is one type of entry recorded in the leg history—a digital network entry. Another type of entry—a digital member entry—gets entered into the person's leg history unilaterally without requiring the activity of another person being a member of the system. For example the accountholder takes a snapshot with a digital camera or videos a scene at a park and uploads it to his databank at the system. Vendors and advertisers can as members of the system transmit to members of the network who enter the store (or who are paying at the cashier) data such as contact information or a store URL. In certain embodiments, the person can enter the data into the person's leg history by simple keyboard while he waits for the cashier.

When the user gets home at the end of his day, he accesses his leg history and sees a list of entries. The types of entries in the leg history are coded—by icon, color or acronym—to indicate whether it is a transmission from another member of the system, whether it is simple contact info such as a URL, whether, it is from a business, whether it is a scene or audio that came from a camera or a tape recorder. It is also time and place stamped. If he enters the item on the list he of course can access the full data transmitted. But the list itself gives him a quick leg history of where he was for any period of time.

In another preferred embodiment, signing up does not entail registering the serial number of the network device used by the member. Rather any network device outfitted with the software of the present invention can be used to access the database containing the digital history of a particular person by providing authentication data uniquely associated with a particular account at the database, which account contains a particular person's digital history.

In a further embodiment, advertising on a person's digital history will be possible and can be based on the profile of URLs that the person has in their digital history.

In a still further embodiment, an improved method of searching the world wide web is provided that makes use of digital histories. In one version of this embodiment, a searching person searches a database of URLs for a certain kind of business (in a particular geographic area or of a certain topic category) by means of a search algorithm that considers a plurality of factors in ranking search results of URLs. The search algorithm is given access to the digital histories of persons who are members of the network and the search algorithm or the system controlling the database finds a target business of that kind (in the particular geographic area or of that topic) wherein a URL of the target business appears in a digital history of a useful person who is a member of the network, the digital history of the useful person also including a URL fora second business of the same kind located in a second geographic area (or a second business of a second kind), wherein the searching person has in his digital history the URL of the second business. As a result, the plurality of factors includes an assignment of priority to the URL of the target business.

OBJECTS AND ADVANTAGES

The following objects and advantages may be present in certain embodiments of the present invention are:

(1) to provide a method and apparatus for the accumulation of a digital history of the person's physical presence over time;

(2) to provide such a method and apparatus that serves a nostalgia purpose in that it allows a person to view digital lists or records of where they have been at various points in time during their life;

(3) to provide such a method and apparatus that also provides a police and public security function by keeping track of a person's physical presence in detail;

(4) to provide such a method and apparatus that also provides a police and public security function by keeping track of the physical presence of a population of persons in detail;

(5) to provide such a method and apparatus as in Object and Advantage "(3)" that benefits the person and thereby encourages the person to maintain the digital history;

(6) to provide such a method and apparatus that also allows a person to trace and find lost objects by allowing the person to identify and then check places that he may have left the object at during a certain most recent time interval;

(7) to provide such a method and apparatus that also serves the function of allowing a business to advertise itself on the digital history thereby creating a new venue for business advertising;

(8) to provide such a method and apparatus as in Object and Advantage "(7)" that allows the business to have an entry in the digital history which functions as an advertisement for that business;

(9) to provide such a method and apparatus as in Object and Advantage "(8)" that includes the URL of the business or a more elaborate advertisement;

(10) to provide a method and apparatus for the accumulation of a digital history of a person's physical presence over a period of time that combines (a) digital network entries received from a member of the network by close-range transmission using network communication devices and (b) digital member entries by the person himself of things the person perceived, i.e. saw, heard, touched, smelled and/or tasted, and that he considered significant;

(11) to provide such a digital history as in Object and Advantage "(10)" wherein the close-range transmission occurs between hand-held communication devices such as cell phones;

(12) to provide such a digital history wherein data is transmitted from the network device of a member of the network to the network device of the person after the person inputs a cue on the person's network device to receive data and wherein after transmission of the data the person inputs a cue to receive said data;

(13) to provide such a digital history wherein digital network entries automatically include a viewable recordation of time and place of entry and wherein digital member entries automatically include a viewable recordation of time and place of entry, the place of entry information coming from a global positioning system that the person is in communication with;

(14) to provide a method and apparatus that would allow a person to sit at home and easily review and relive important moments of their life;

(15) to provide a method and apparatus of capturing important moments in a person's life;

(16) to provide a method and apparatus that allows a person to capture, access and relive important moments or periods of the person's life in the form of a digital "leg" history;

(17) to provide to provide a method and apparatus that allows a person to capture, access and relive important moments or periods of the person's life in the form of a digital "leg" history and that simultaneously provides a format for businesses to advertise within the digital "leg" history;

(18) to provide a method and apparatus for the exchange of electronic business cards;

(19) to provide a method and apparatus for the exchange of URLs;

(20) to provide a method and apparatus for the exchange of URLs that can include the URLs of businesses;

(21) to provide a method and apparatus as described in the above Objects and Advantages in which the digital network entries and the digital member entries are automatically transmitted to a database located on a telecommunications network (such as a global telecommunications network) at the time of entry,

(22) to provide a method and apparatus as described in Object and Advantage "(20)" wherein access to an entire collection of the digital history for viewing thereof can be accomplished by the person by accessing the database;

(23) to provide a method and apparatus for a digital "leg" history that includes entries from vendors or businesses who are members of the network, said entries occurring when a person who is a member of the network enters the premises of the vendor or business and receives an automatic electronic transmission from pre-placed network communication devices located at entrances to said premises;

(24) to provide a method and apparatus as per Object and Advantage "(23)" wherein the person chooses whether to accept the transmission from the vendor or business upon entry into the premises;

(25) to provide a method and apparatus for a digital history of a person over time which requires the person to sign up with a network, for example, at a web site;

(26) to provide such a method and apparatus of a digital history wherein when you sign up you have the option of providing data that would be sent to your network communication device, such as a cell phone, which upon encountering another member of the network can be transmitted to said other member;

(27) to provide such a method and apparatus for a digital history as per Object and Advantage "(26)" wherein said data can include such things as an electronic business or a URL;

(28) to provide such a method and apparatus for a digital history as per Object and Advantage "(27)" wherein said data can also include anything important to the person such as a song that they like or an insight into a topic they are studying;

(29) a method and apparatus of a digital "leg" history wherein in certain alternative embodiments, when the person signs up with the network the person has the option of allowing advertisers or a select subset of advertisers to automatically send advertisements into your digital history;

(30) a method and apparatus of creating a digital representation of a person's past;

(31) a method and apparatus of creating an updateable digital representation of a person's past;

(32) to provide a method and apparatus for a digital "leg" history wherein entries in the leg history, particular digital network entries, can be just a URL alone, such that when the person reviews the digital history, the person can make a single click on the URL and automatically be taken to the member's web site associated with that URL;

(33) to provide a new method and apparatus for organizing information about a person;

(34) to provide a new method and apparatus for organizing and reviewing information about a large group of people;

(35) to provide a digital leg history that through continuous daily updating can transform the daily leg history into a monthly, a yearly and a decade or longer leg history;

(36) to provide a digital leg history that is not difficult or time-consuming to accumulate;

(37) to provide a new way to organize information that is important to a person;

(38) to provide a method and apparatus that combines the interests of advertisers and of ordinary potential consumers;

(39) to provide a method and apparatus for a digital leg history that uses a global position system to trigger the recordation of time and place based upon a person's data entry or data transfer;

(40) to provide a method and apparatus for a digital leg history that is accumulated effortlessly in the sense that it is incidental to data tasks that would otherwise be performed anyway;

(41) to provide a method of serving advertisements to a person based on the URL profiles of the person whose leg history it is;

(42) to provide a method and apparatus of a collection of URLs forming part of the leg history of the present invention such that advertisers serve advertisements in the leg history based on the nature of these URLs;

(43) to provide a method of using digital histories to improve web searching by identifying a "useful business" in accordance with one embodiment of the present invention;

(44) to provide a method of using digital histories to enhance web searching through enhancing networking opportunities;

(45) to provide a method of using digital histories in web searching that has the effect of elevating the importance of smaller companies and entities relative to larger business and entities within the world wide and web and Internet; and

(46) to provide a digital leg history whose entries are in chronological order.

DETAILED DESCRIPTION OF THE PREFERRED EMBODIMENT

Figure 1:
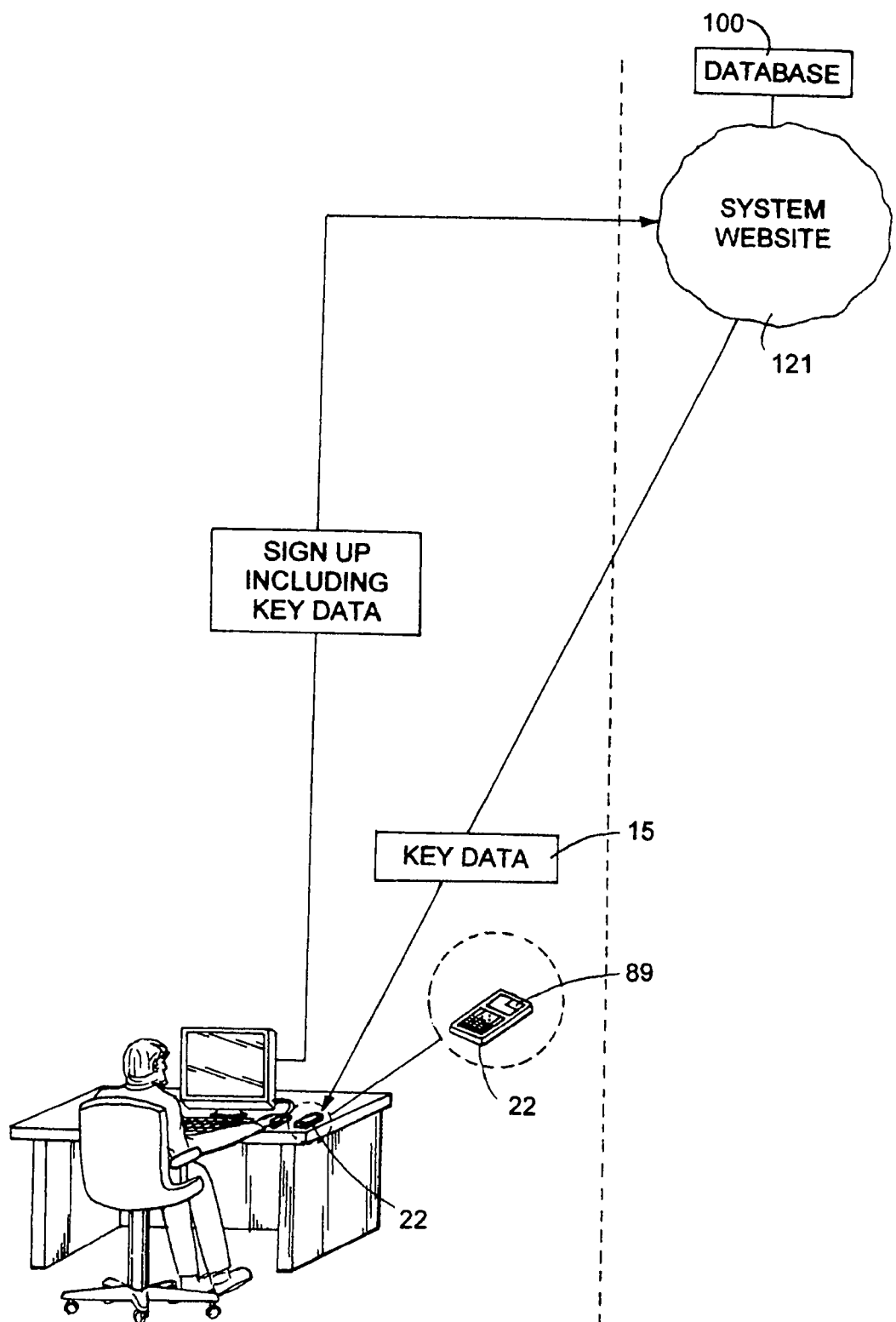
FIG. 1 is a simplified schematic diagram in accordance with the method and apparatus of the present invention showing a member signing up and providing key data, which data is then transmitted to the member's cell phone.

The apparatus and method of the present invention will now be illustrated by reference to the accompanying drawings. The apparatus of the present invention has been assigned reference numeral 10 Other elements have been assigned the reference numerals referred to below.

As seen from FIGS. 1-5, apparatus 10 is a viewable and updateable digital history 10 of a person's physical presence over a time. It is a chronologically arranged collection of viewable entries on a computer or other viewable electronic device. The collection includes various types of entries, which can be divided into general categories. Each category of entries has preferably numerous entries in the category. In an alternative embodiment, there can be only one entry in a particular category.

In order for any entry in the digital leg history to occur, the system has to first be set up. A manufacturer of electronic devices such as cell phones has to have agreed to install software 89, whose content is known to those skilled in the art of computer science, into the cell phone or other device allowing it to upload data to a database on a global (or smaller) telecommunication network such as the world wide web and to receive and transmit wirelessly to other such devices, for example known short range wireless communications methods such as Bluetooth®. Such software 89 can be readily developed or is already known to those skilled in the art.

When the present invention refers to cell phones as an example of a handheld electronic network device 22, it should be understood that the present invention specifically contemplates other such electronic devices that could carry the software 89 used in the present invention. For example, network device 22 can include any other handheld electronic device that is typically carried around by people during their day including IPods, cellular telephones, personal digital assistants, small laptop computers media players including video and/or game players, possibly digital cameras, Internet terminals, and GPS and remote control devices. In certain embodiments, it could also include bar code scanners. It can also include multi-function electronic devices that incorporate the functionalities of all or combinations of these devices. In addition, vendors may utilize electronic devices that are at the entrances to their premises, as explained more fully below. In such a case, the device 22 need not be handheld and could be a computer.

In a preferred embodiment, customers of the system of the present invention sign up at a web site 121 for a fee and obtain an account with the system, thereby becoming a member of the network. In certain other preferred embodiments, no fee will be charged. By signing up the members thereby obtain data receiving privileges. They also thereby obtain limited data transmitting privileges, in that they can transmit their URL (or other basic contact information) to another member of the system. If they want more extensive data transmitting privileges, they pay more (or enroll without paying in certain embodiments) under a separate package. In either case, they provide a digital copy of the data that they want to have stored in their cell phone to be transmitted to others. This data is sometimes referred to herein for convenience as "key data" 15. The key data 15 can be a business card, a URL, or, under the more extensive data transmitting package, key data 15 can be a song they like or a discussion of a topic they are studying, or it can be anything else that the member considered significant enough to be transmitted later. In certain alternative embodiments, key data 15 is limited to URLs, or in other embodiments, limited to URLs, electronic business cards and business advertisements.

In a preferred embodiment, key data 15 can be updated by the member after the member has signed up by accessing the database 100 at web site 121. Accordingly, the member is not limited to having their digital network entries 20 be fixed forever. In one preferred embodiment, signing up requires identifying the particular electronic device with its serial number. The system recognizes that device's right to upload data entries to the account/databank. At the beginning, the system also transmits the key data 15 to that device. The cell phone or other device thereby becomes a network communication device.

Figure 6:
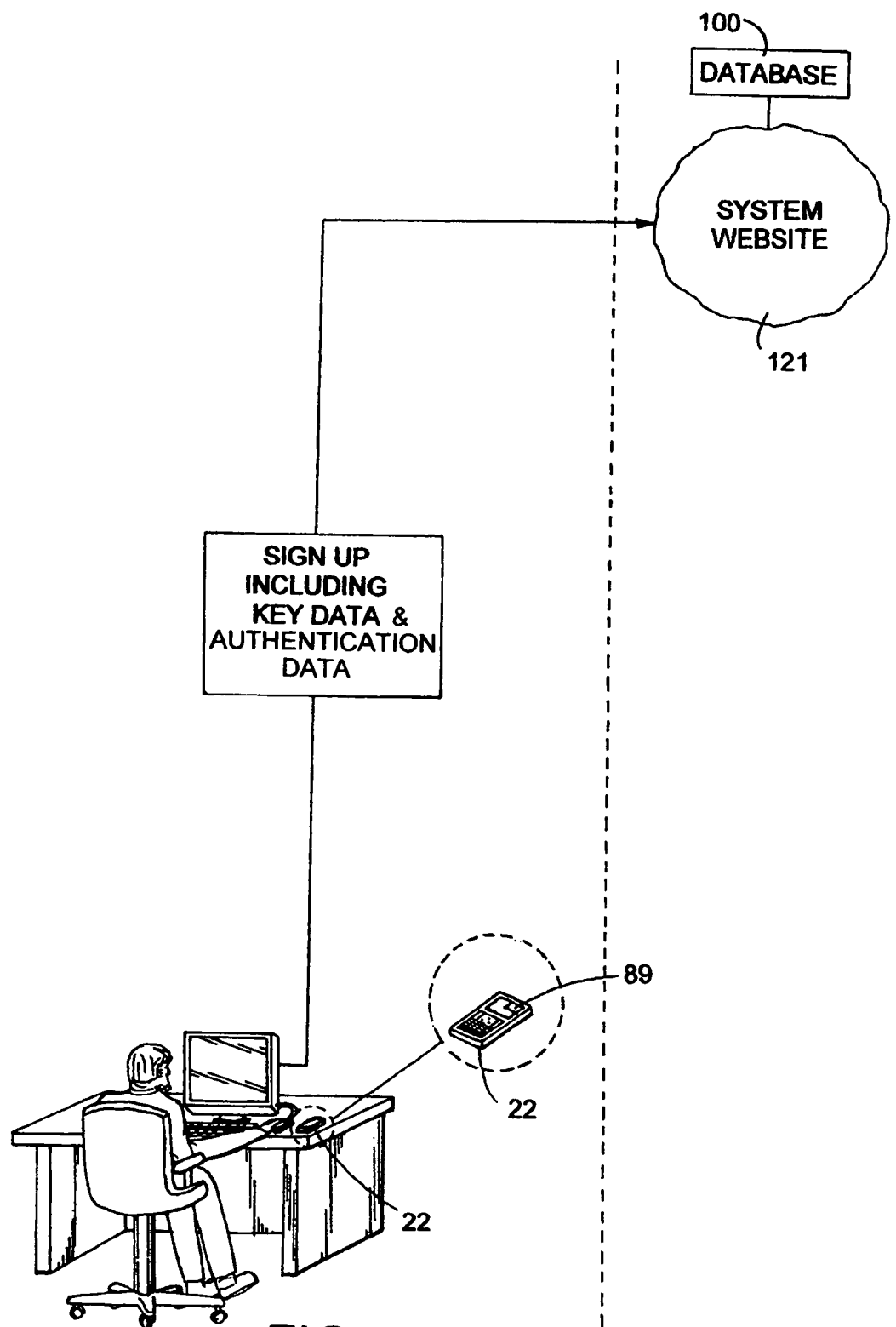
FIG. 6 is a simplified schematic diagram in accordance with the method and apparatus of the present invention showing a member signing up and providing key data.
Figure 7:
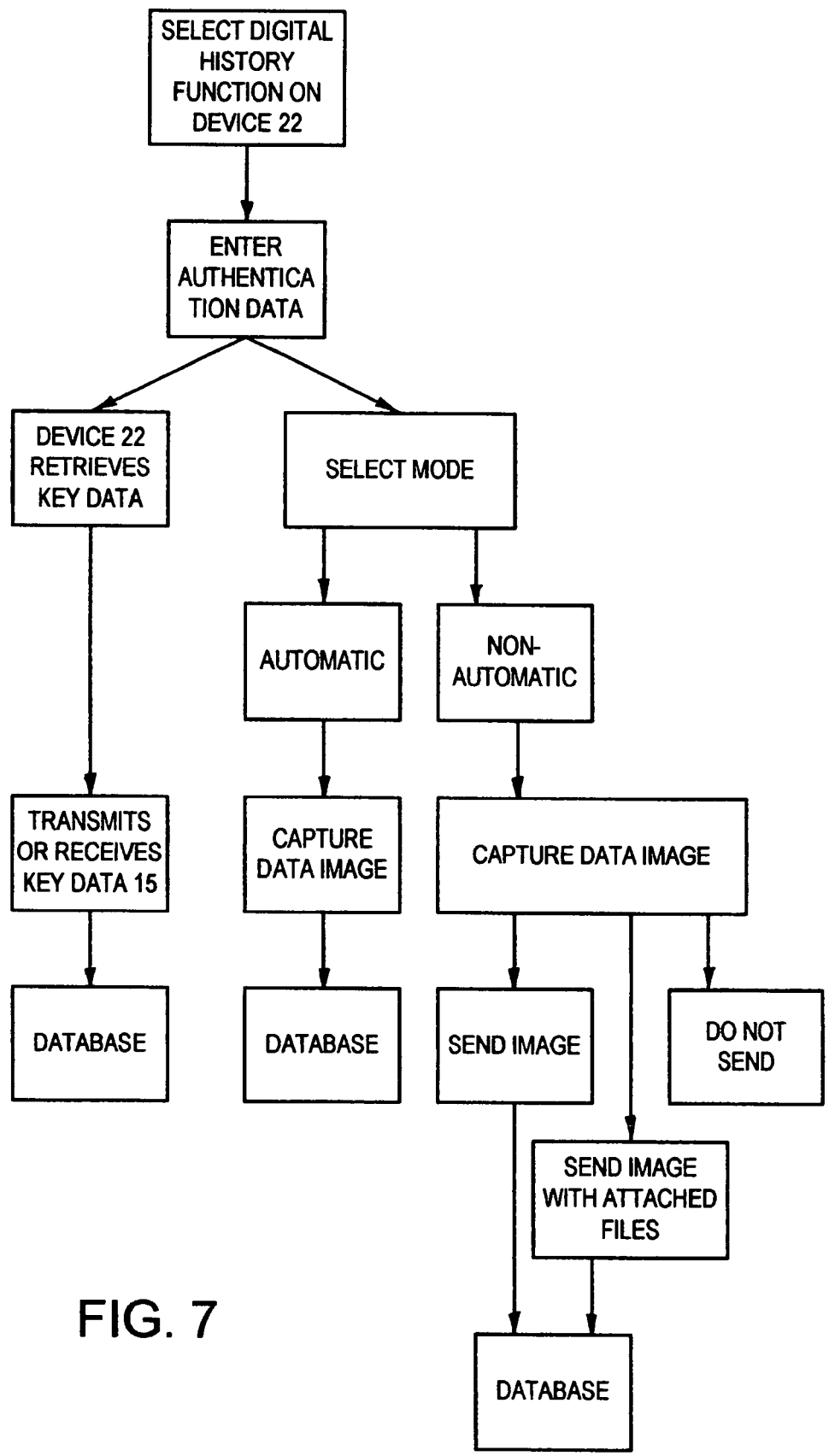
FIG. 7 is a flow chart for the second preferred embodiment covering the steps leading to a digital network entry or a digital member entry in accordance with the present invention.
Figure 8:
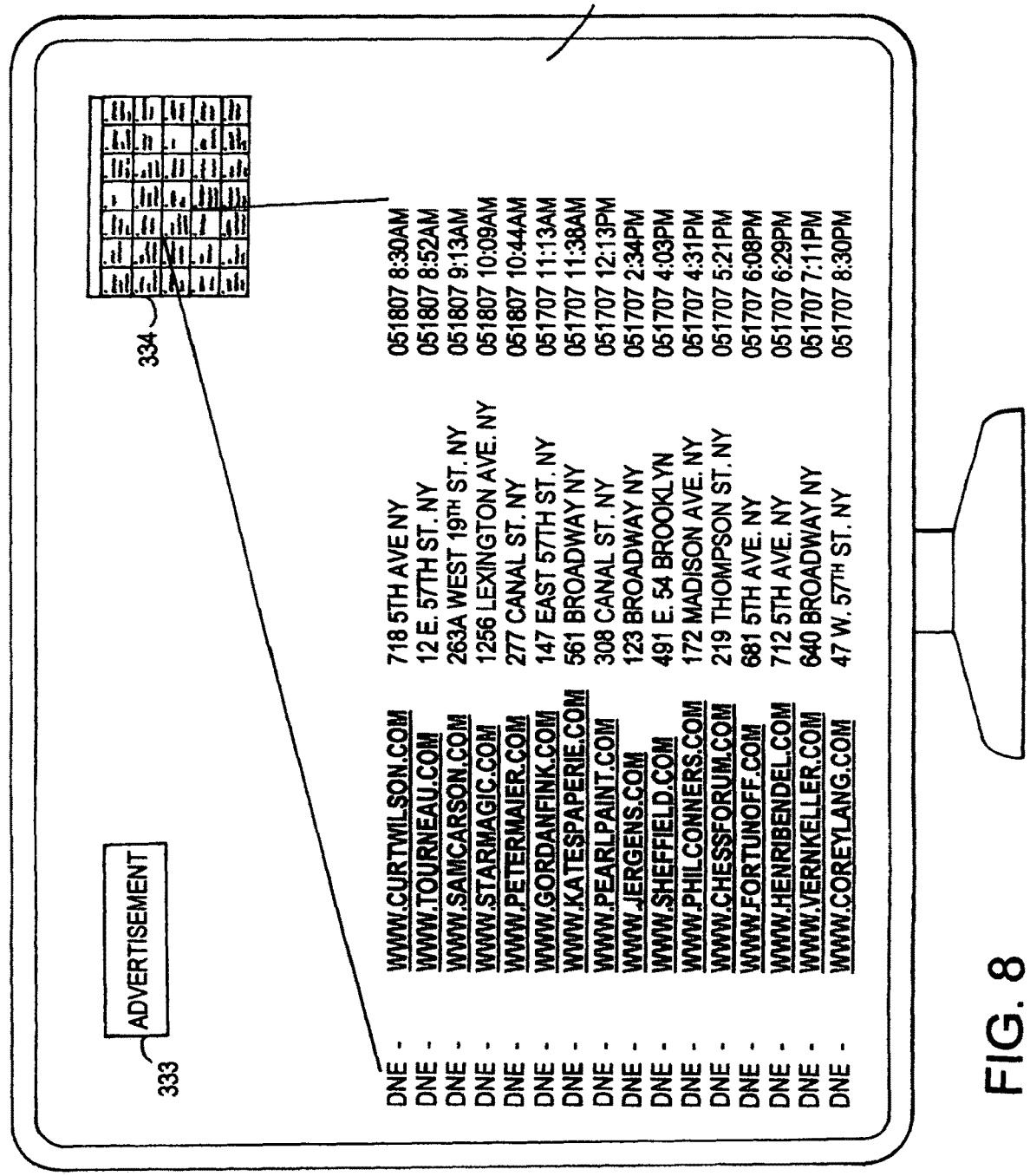
FIG. 8 is a digital history of the present invention containing only URLs and appearing in the "monthly calendar" embodiment.

In a second more preferred embodiment depicted in FIGS. 6-8, the network device 22 is not registered upon sign up. Rather, any network device can be used by any member of the system provided it has software 89 in it. Upon sign up for the system, a member selects a user name and password that will be uniquely associated with his account on the database 100. Alternatively, the new member of the network provides some other authentication data which is uniquely associated with his particular account.

Software 89 in device 22 allows a user to interact with his account at database 100 using device 22, including accessing and retrieving key data 15, and processes digital network entries 20 and digital member entries 30. Making use of software 89, the user interfaces with device 22 so as to navigate to or select the leg history function within device 22. Software 89 in the network device 22 will then prompt the user of the device 22 to enter authentication data uniquely associated with his user account on the database 100. Upon entry of this authentication data, the network device wirelessly connects the operator of the device 22 to the account at system database 100 associated with that authentication data. This allows the person controlling device 22 to access or transmit data to the digital leg history 10 for that account.

Accordingly, anyone who enters a certain user and password or other authentication data will have the ability to send digital network entries and digital member entries to the digital leg history of the member whose authentication data was provided. Among other things, this would allow a network device to be borrowed by a friend who wishes to send his (the friend's) digital member entry to his (the friend's) digital leg history. Furthermore, if the network device were stolen or entered the possession of the wrong person, such person could not send data to or alter the digital leg history of the proper owner.

In this second preferred embodiment, upon signing up with the system, key data 15 is still provided. But the key data 15 is not tied to any particular network device 22 and is not automatically transmitted to the network device 22 of the accountholder. Hence, signing up does not trigger key data 15 being transmitted to any network device 22. Software 89 in device 22 is such that entry of authentication data into device 22 causes device 22 to communicate with the appropriate account at database 100 and "know" that a particular key data 15 is associated with the accountholder that was authenticated. Accordingly, if the member wishes to generate a digital network entry 20, device 22 then transmits that key data to another member at short range for entry into the leg history of the recipient individual using the short range communication method described above, including for example by holding their devices 22 facing each other and transmitting/receiving.

In this second preferred embodiment, preferably when a member transmits digital network entries 20 between his device 22 and a network device 22 of some other member of the network at short range, if the authentication data has not already been entered, then it must be entered prior to the transmission. In an alternative embodiment, the transmitted key data is stored in device 22 but then to enter the data into the leg history the authentication data must be entered after receipt of the transmission.

Likewise, as shown in FIG. 7, after entering authentication data, if the member wishes to capture a sensory image for entry of a digital member entry 30 into leg history 10, in a preferred embodiment, the user/member selects automatic mode or non-automatic mode. In automatic mode any sensory image captured by device 22 is automatically forwarded to database 100 as a digital member entry 30. In non-automatic mode, upon the capture of a sensory image as data into device 22, a window or other prompt opens up and prompts the user to (i) transmit the image to the database 100 for entry into leg history 10 as a digital member entry 30, (ii) not transmit the image to database 100 or (iii) to transmit the image along with an attached file or an attached note of the member.

The first type of entry in the digital history 10 is digital network entries made by a person who has signed up and is a member of a network. The digital network entries 20 can occur at any point in time after signing up. As an individual goes through his day, he may encounter people and may consider the encounter significant enough to record in his digital leg history or he may consider the data transmitted from the person he met significant enough to be recorded in his digital leg history. The digital network entries 20 are comprised of various kinds of data that was transmitted from a network device 22 of some other member of the network to the network device of the person whose digital leg history is being formed. In a preferred embodiment, digital network entries are transferred at short range using wireless communication methods. This is illustrated more fully below and in FIG. 2. The definition of "short range" or "proximity" would vary depending on the technical specifications of the wireless transmission. Purely by way of illustration, in one preferred embodiment, "proximate" can mean twenty feet or less.

Figure 2:
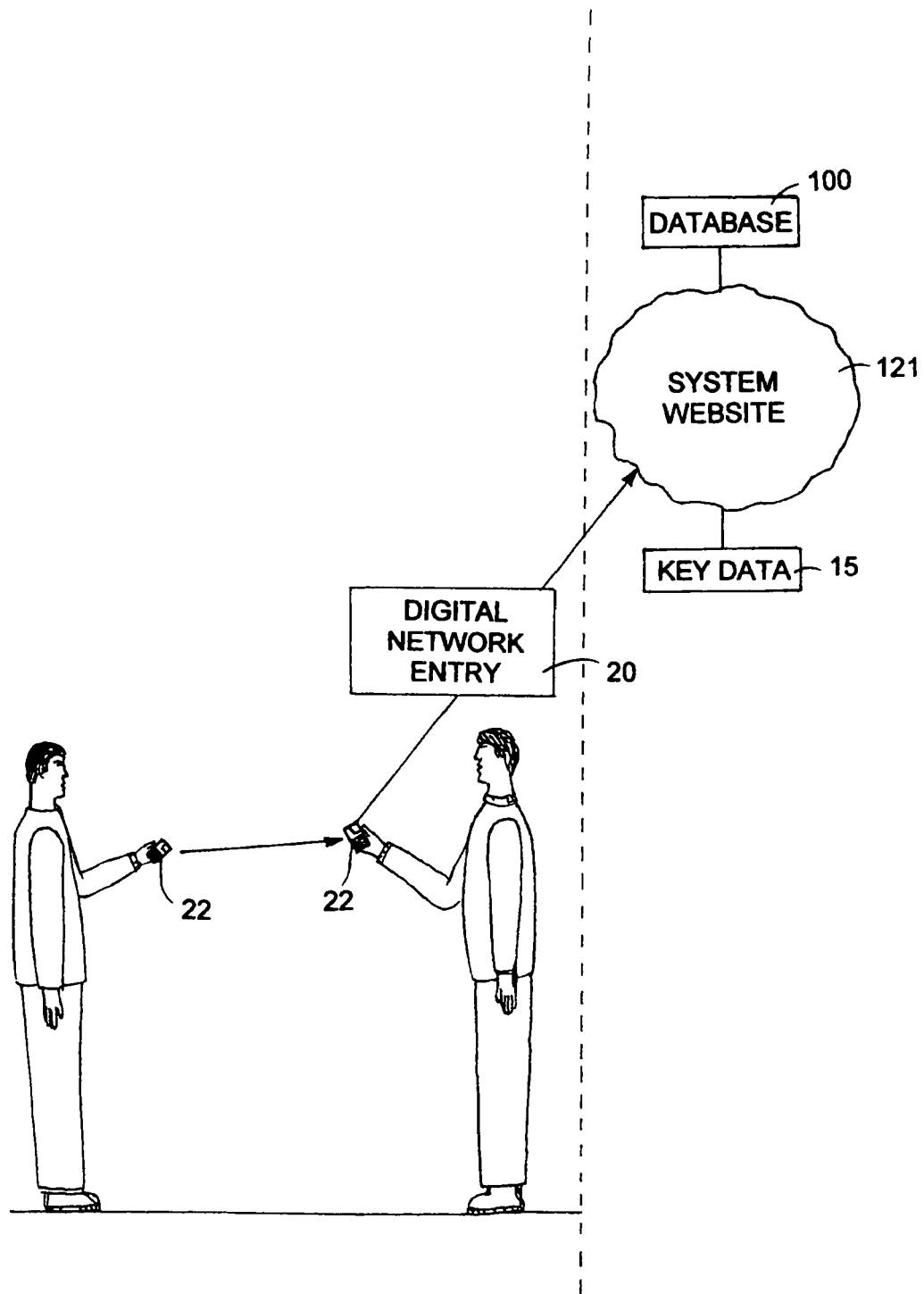
FIG. 2 is a simplified schematic diagram of an encounter between two members of the network that generates a digital network entry into the leg history of one of the members in accordance with the method and apparatus of the present invention.

If the two individuals are both members of the system and are close enough to one another they each take out their cell phones or other electronic communication devices and if required by the wireless communication method position them so that they face one another, as shown in FIG. 2. The exact transmission mechanism can occur in a number of ways, and the present invention is not limited to one particular method or the exact illustration shown in FIG. 2. In one preferred embodiment, the receiving individual first pushes a button on his or her cell phone to put the receiving person's phone in receiving mode. Then the transmitting person pushes a button on his or her cell phone causing the data of the transmitting person to be transmitted to the receiver's cell phone or device. The receiving individual then pushes the same button on his cell phone that he pushed before and he thereby stores and "accepts" the data. This automatically also transmits the data to the system web site and online database 100 storing the digital leg history. Alternatively, a separate button has to be pushed to transmit to the database.

This is a general description of digital network entries, which is one type of entry recorded in the leg history 10. Another type of digital network entry 20, and one which offers big advantages in business advertising, involves vendors who are members of the network. Stores will recognize the value of getting into your digital leg history 10 at database 100, the way they recognize the value of being in the newspapers you read or the web sites you visit. So if you encounter a store or other business and the store is part of the network, one way it can transmit to you data is by placing transmitting devices near each store entrance.

Figure 3:
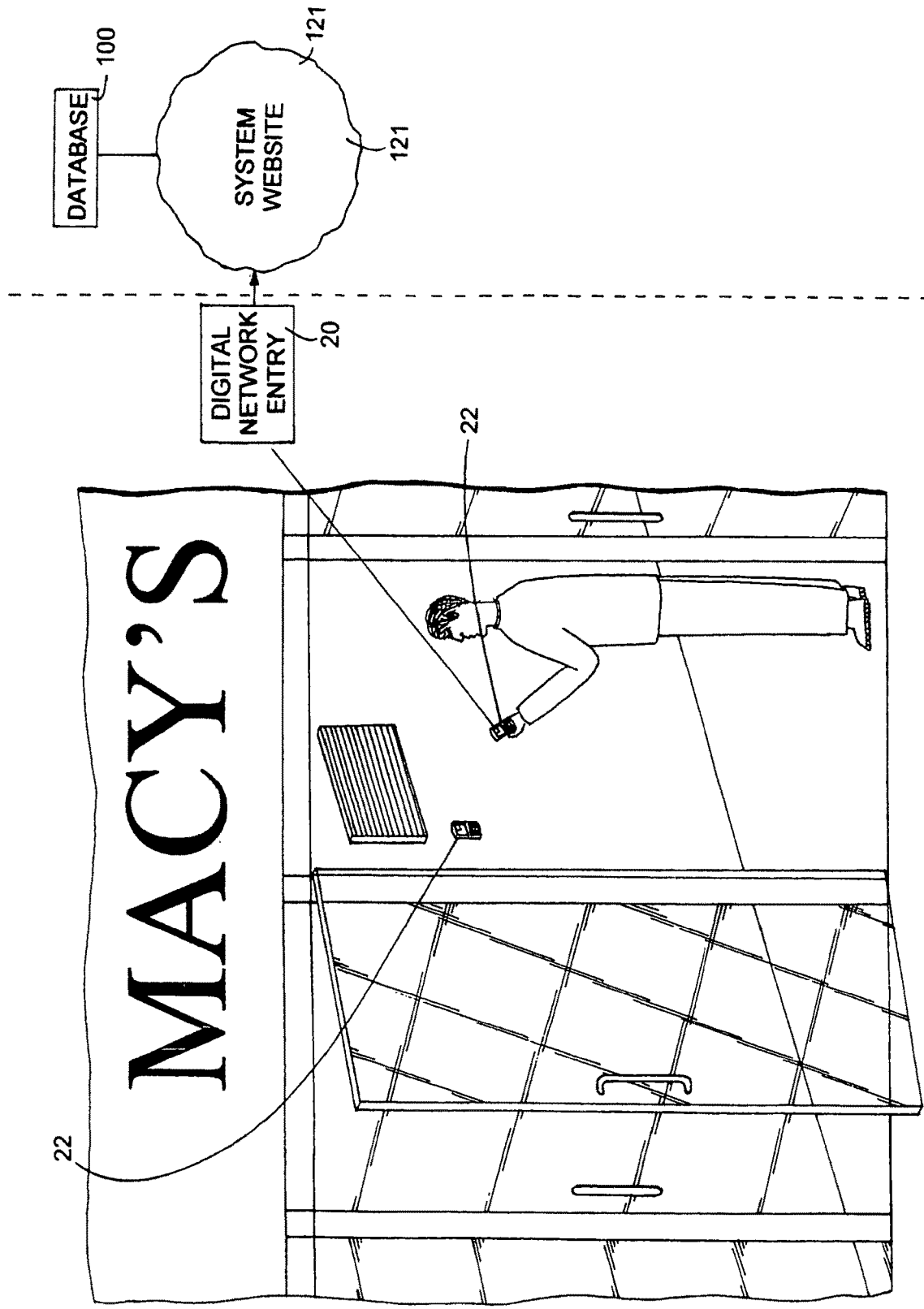
FIG. 3 is a simplified schematic diagram showing an individual member of the network entering the premises of a vendor member of the network and accepting a transmission from the vendor's pre-positioned device that generates a digital network entry in the digital leg history of the member in accordance with the method and apparatus of the present invention.
Figure 3A:
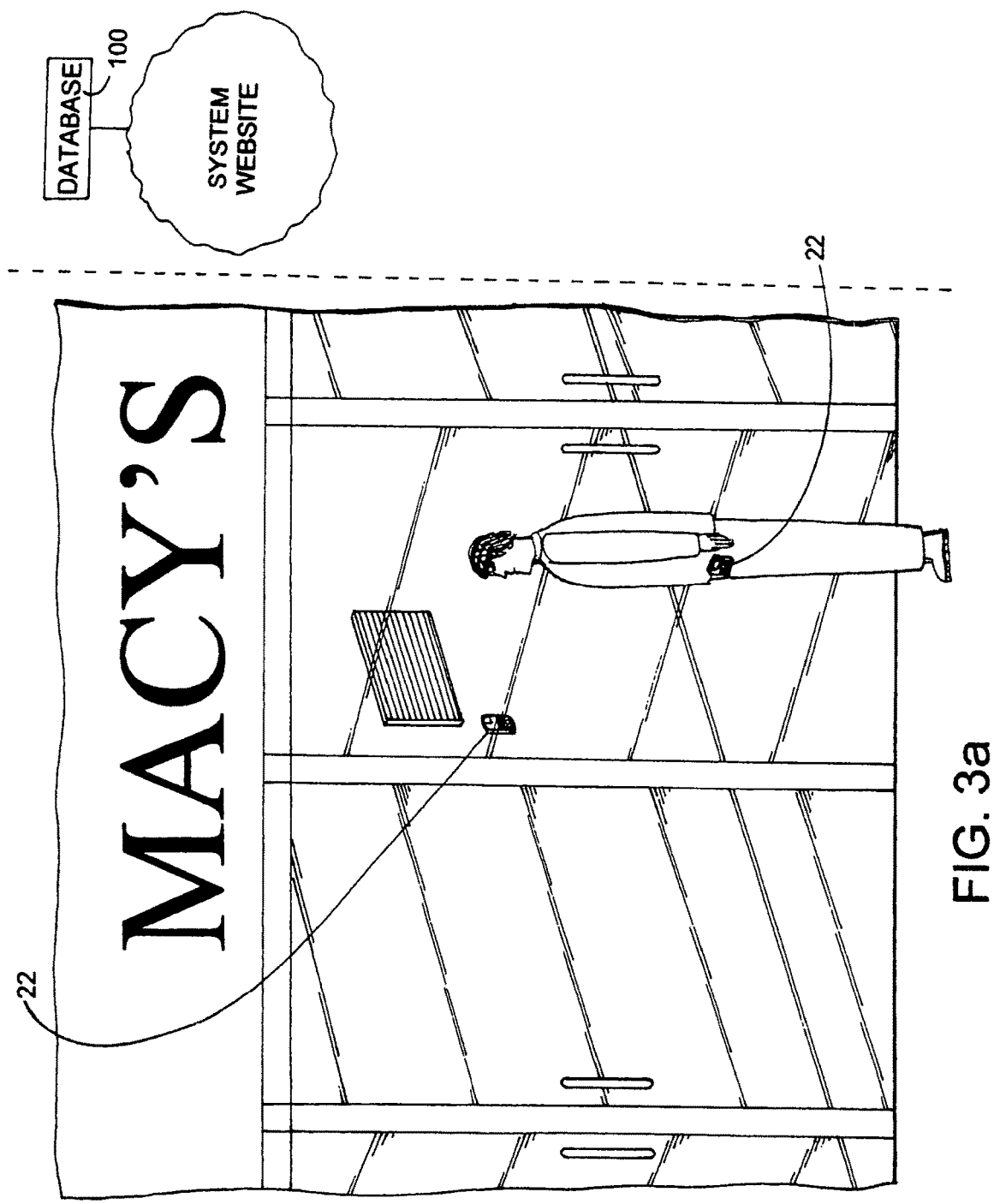
FIG. 3A is a simplified schematic diagram of a member adjacent a second entrance to the premise of the vendor member of FIG. 3.

As shown in FIG. 3, the minute you enter the store your electronic communication device, such as a cell phone, receives a message or signal from the store's pre-positioned transmitting cell phone or other transmitting device near any of the entrances of the premises. The data that the store is proposing to transmit to you is the store's electronic business card, the store's URL or other an advertisement or promotional information from the store. It would be key data 15 that the store, as a member of the network, previously provided to an account at database 100. Again, purely by way of an illustration of one preferred embodiment of the manner in which the transmission would take place, if the member who receives a signal from the vendor member or store then hits the button on his cell phone to accept and store the information, the data is transmitted, stored and automatically sent to the database 100 on the system web site at the member's account at database 100 that holds the digital leg history (e.g. 10A) of the individual member. FIG. 3A shows that the store has other pre-positioned electronic communication devices at other entrances to is premises.

Although the drawing figures show database 100 as being located at a system web site, the present invention also contemplates database 100 being located remote from network device 22 held by the member at any telecommunications network. Typically, said telecommunications network would be a global network such as the world wide web, although it does not have to be.

In certain alternative embodiments, the store personnel approach store customers who entered the store and offer to transmit a digital network entry containing the store URL, contact information, advertisement or promotion. In a further alternative embodiment, the member types in or otherwise inputs the name of the store while he is paying at the cashier.

In certain alternative embodiments, when you sign up with the system you can choose to allow businesses in a particular industry to have the right to transmit proposed advertising to your digital leg history at any time. This is an alternative embodiment, since it may be too invasive, although controls can be added to moderate the invasiveness. For example, the member can set their digital leg history to a mode that does not accept any such advertising or there can be option to delete all advertising that came into the leg history other than data that was transmitted when the person was physically present in the premises of the business.

The present invention also envisions having the digital network entries and the digital member entries coded to allow the user to instantly recognize the type of entry it is even while reviewing the digital leg history itself. One type of coding can be color codes. Another type of coding can be icons adjacent the beginning of the title of the entry. A further type of code can be an acronym—"BC" for a text or art consisting of an electronic business card, "T" for text, "AV" for audiovisual, "P" for photograph, "DNE" for digital network entry, "DME" for digital member entry. The "T" may indicate that there is a significant amount of text (i.e. a song) rather than one line of a URL or three lines of contact information. The acronyms can be stylized and/or can incorporate an icon. As can be seen from the acronyms, the codes can distinguish between digital network entries and digital member entries. The codes can also distinguish between different types of digital member entries—audio, visual, audiovisual, etc.

In a preferred embodiment, when the data first goes from the system's web site to the transmitter's cell phone the data is "coded" in any manner known to those skilled in the art so that when the transmitter later transmits it to a recipient, the recipient cannot re-transmit that sender's data to another member of the network even if the recipient attains or has transmitting privileges.

As previously noted, network device 22 should have short range wireless capability to be able to receive and transmit data or various times (text, video, audio, etc.) to and from other members of the network. In addition, device 22 should be able to transmit data wirelessly to the database 100 on the world wide web.

The second type of entry in digital leg history 10 is one or more digital member entries 30. These entries are entries that are made unilaterally at any point in time by the person whose digital leg history it is. The member entries arise when the person perceives something where he is (i.e. where his legs are) and decides to capture it and incorporate it into his digital leg history. The data that forms the digital member entry 30 can be any a digital representation of any sensory image perceived by the member at a point during the time that the digital leg history covered. By definition, the data would be something that the member considers significant enough to enter into his leg history. In contrast to the digital network entries 20 the digital member entries 30 that get entered into the person's leg history are unilateral—they do not require receiving anything from another person who a member of the network/system.

A simple example of a digital member entry 30 occurs when the member is carrying a digital camera and decides to take a photograph of something. It is noted that the digital camera we are speaking of would be one that has the capability to upload data to a database on a global telecommunications network such as the Internet. Applicant is not aware of whether such a digital camera exists presently on the market at present. In either case, the technology certainly exists for incorporating wireless transmitting capability into a digital camera, if only by conjoining a digital camera with a cellular telephone, a PDA, IPOD® or other electronic device.

In certain embodiments, another example of a digital member entry 30 (not shown in the digital leg history 10 depicted in FIG. 5) can occur when a member can enter text into network device 22 whether manually or otherwise and thereby record the time and place of their intellectual advancement. Preferably, the "time" means the calendar date and the time or it can mean the date alone or the time of day alone. The text can be a sudden insight into a study topic, for example. This is particularly important for creative people or people who study all day long, i.e. researchers or students of religious texts.

Figure 4:
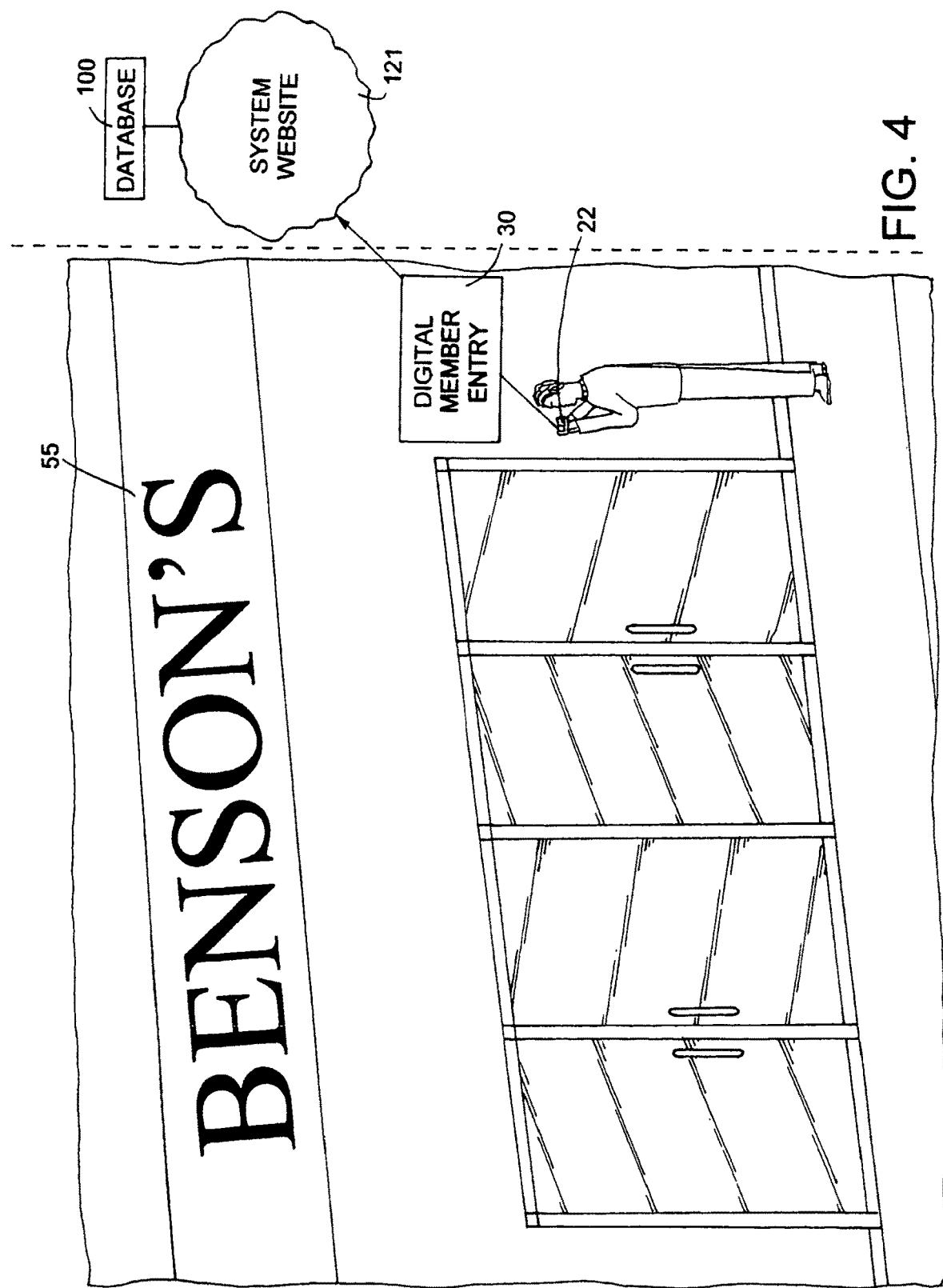
FIG. 4 is a simplified schematic diagram of a situation where a member photographs a store sign to generate a digital member entry into the leg history of a member in accordance with the apparatus and method of the present invention.

Suppose the member wants to record all the places he will go to in a long afternoon of errands and store visits. He wants to record that he went into a particular store and enter it into his leg history. After he leaves the store he positions the camera and takes a photograph of the sign 55 in the front of the store (or any other distinguishing feature of the store that reminds him of the experience of going into that store). As shown in FIG. 4, the photograph of store sign 55 is automatically transmitted to database 100 for entry into the digital leg history 10 as a digital member entry 30. In a preferred embodiment, as shown in FIG. 5 the photograph is coded to indicate that it is a photograph by having the name of the store preceded by the letter "P" in iconic or stylized fashion.

Figure 5:
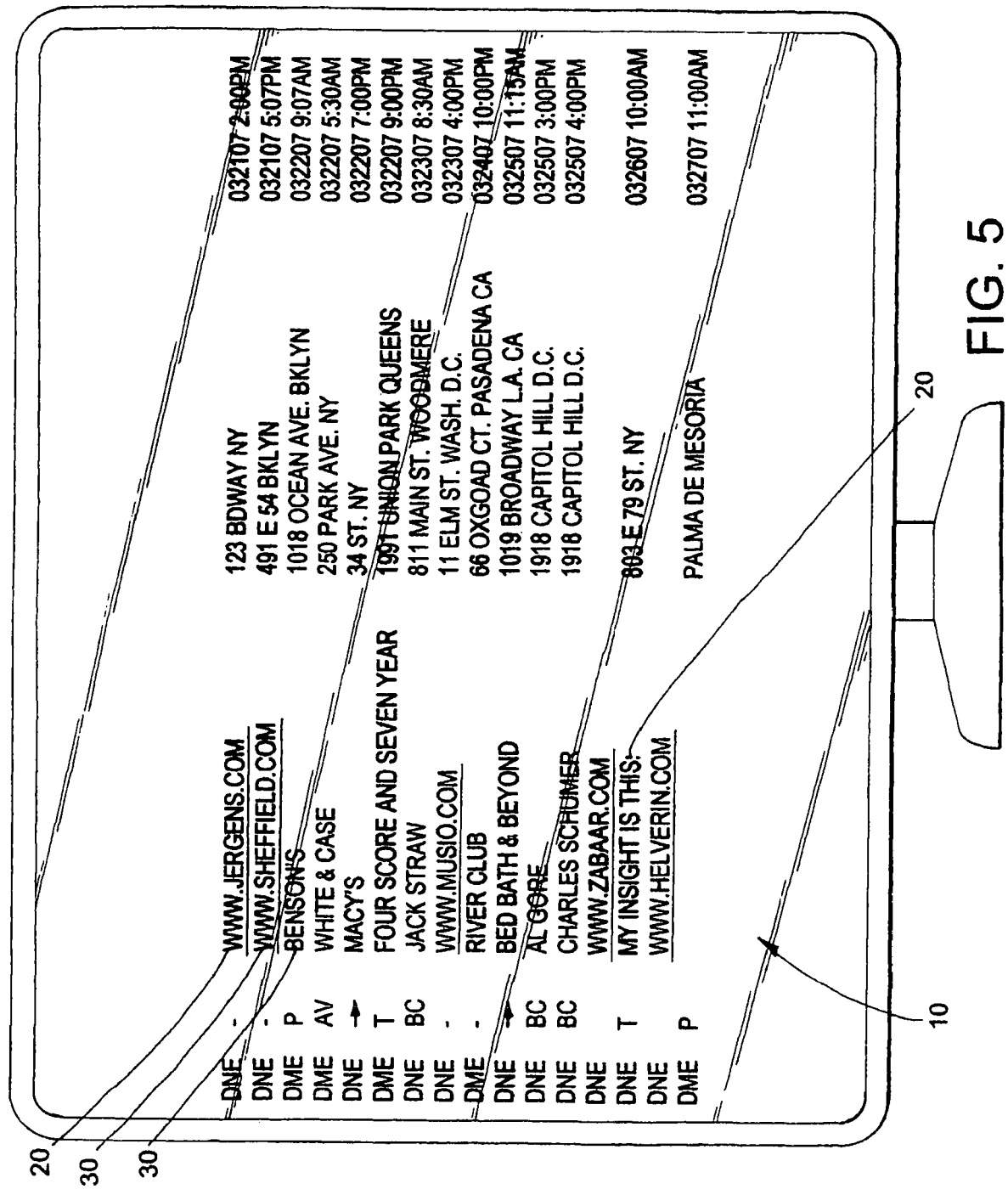
FIG. 5 is a screen page in the digital leg history of a member displayed on a computer screen of a PDA or other electronic device of a member in accordance with the apparatus and method of the present invention.

The reason that iconic or stylized codes are used to describe the types of digital member entries 30 and digital network entries 20 is that when the member accesses and reviews his or her digital leg history 10, see e.g. FIG. 5, the member does not see all the data on the initial screen. The screen shown in FIG. 5 is merely the initial screen of the list of entries comprising the digital leg history 10. The member then has the ability to call up the full entry by clicking on or otherwise selecting that entry seen on the screen. For the benefit of obtaining an overview of the entries in the digital leg history 10, the icons or codes preceding the entry are provided. As can be seen in FIG. 5, the places are and times of entry are also recorded. The places are obtaining from the fact that each device 22 is capable of communicating with and receiving place data from the global positioning system used in the present invention. It is noted that the global positioning device uses a satellite or any other appropriate means known to those skilled in the art.

As shown in FIG. 8, in one preferred embodiment, the digital history 10 is presented as a monthly calendar 334 broken down by date wherein within each date there is a series of entries (digital network entries and/or digital member entries) substantially in the form as shown in FIG. 8. Preferably, in this "monthly calendar" embodiment as shown in FIG. 8 the entries on each date in the calendar may be rather small to read. Accordingly, when one clicks on a particular date, say May 18, that date opens a window containing only the entries for that date, which window is large to enough to occupy at least a good part of the screen (calendar 334, preferably, is then viewable in the background). It is noted that although in FIG. 8 URLs are the only entries in the digital leg history 10, this should not be taken to mean that the monthly calendar embodiment requires this. This is an alternative embodiment combined with the "monthly calendar" embodiment.

As noted, it is believed that in the not too distant future virtually all individuals will have URLs, which constitute a form of advertisement for themselves, and that chance encounters between people will result in the desire to exchange URLs, which in effect involves having people access the world wide web outdoors, the present invention makes use of this important development by using global positioning systems to trigger a recordation of time and place based on a person's having performed a data transfer or a data entry (at least those that the person considers significant pursuant to the present invention), rather than based on a person's simply being somewhere. This is particularly important in a world in which data transfers are themselves more and more essential.

Although FIG. 5 depicts the place data in the form of a written address, other ways of depicting place data may be used. For example, the zip code of the location alone may be used for space reasons. Alternatively, any place data, i.e. digital representation of the location where the entry was made, may be used in the initial screen of the digital leg history and then by clicking specifically on that place data the full address may be retrieved.

In a preferred embodiment, by clicking on or otherwise selecting a particular URL depicted in the initial screen 10 of digital leg history 10, the user immediately is taken to the web site called for. In this way, a person meeting someone new can electronically receive that person's URL (provided the person is a member of the network at least at some level of privileges), for example using the procedure depicted above and shown in FIG. 2, and then at any later time go to that person's web site. The owner of the digital leg history not only has the contact information of the other member at his disposal, but has a simple way to enter the web site of the other individual. It is believed that in the not too distant future this will be particularly useful because it will allow a "world" in which everyone has a web site and people can simply exchange their URLs and invite others to instantly enter their web sites.

It should be understood that the digital leg history 10 will be searchable in a variety of ways for the member. Purely by way of example, software either located in the network device 22 (and forming a part of software 89) or accessible by the computer that houses the database will allow the member, at the touch of a button to place the entries 20, 30 in order whether chronologically, by the location of the entry, by the identity of the person or vendor, by data type, etc. This is a searching feature. In a preferred embodiment, unless the user indicates otherwise, the default ordering of entries in digital leg history 10 will be chronological. Preferably, although the user can re-order the entries in leg history 10, the essence of the digital leg history is a chronological presentation of such entries, because the word "history" in the phrase "digital leg "history" denotes such a chronological ordering.

A person who wishes to access their digital leg history 10 does so, in a preferred embodiment, by accessing database 100 at a web site on the world wide web or other telecommunications network. In an alternative embodiment, the person stores leg history 10 on his own hard drive of any appropriate computer device.

In a further embodiment of the present invention, the entire database 100 may be searchable by a member who has a digital history 10 on the database 100. A searcher can search for any entry—digital network entry 20 or digital member entry 30—in database 100 that satisfies a particular time/place characteristic. For example, "Sep. 11, 2001 and New York, N.Y." might retrieve any entry that was entered into a digital history 10 within database 100 on that date and at that place. In this embodiment, a search engine controlled by the system operating database 100 will perform the searching in accordance with an algorithm provided to it. The time and place characteristics can in certain embodiments also be broader than the entry in the digital history, for example "the week on Sep. 11, 2001 and New York City". The above database searching can be accomplished due to the fact that database 100 has digital histories 10 whose entries are stamped based not only the time of their entry but also based on the place at which that they were entered. Furthermore, the place of entry and the time of entry are separate labels that are independent of the content of the entry itself.

Accordingly, a method is presented of searching a database containing entries having time and place labels or stamps. The database is database 100 representing a collection of digital histories 10 or in certain embodiments is any other database having documents labeled by not just time but also the place at which the data file was entered. Thus, the entry is associated with the time and with the place. The method comprises providing a database of documents, each of said documents having a label, said label indicating a time at which and a place at which the document was entered into said database, (ii) inputting a time and a place as a search term in a search engine algorithm, the search engine algorithm having access to the database and (iii) retrieving search results that correspond to the time and place inputted.

Since the present invention may combine features from different embodiments, it should be also noted that if the store (see FIG. 4) is a member then as he enters the store his digital camera, cell phone or other electronic device that he registered when he signed up will receive a proposed entry from the store's electronic device pre-positioned at the entrance. However, that would be a digital network entry rather than a digital member entry because it comes from a fellow member and is not unilateral. In the second preferred embodiment, the device 22 held by the member of the network would receive a proposed entry from the store's electronic device at the entrance to the store even though the device 22 itself is not registered with the system, provided the device 22 has software 89 within it. It would then be up to the user to enter authentication data if he wanted to accept the entry and transmit it to the digital leg history 10. Alternatively, if the user had already entered authentication data prior to entering the premises of the store, he merely has to accept the proposed entry from the store and the entry will be automatically captured and transmitted to the leg history 10 at database 100.

In another example of a digital member entry 30, the member takes a snapshot with a digital camera or videos a scene at a park and uploads it to his databank at the system. An hour later he meets with someone and records a snippet of the audio from the meeting. This entry is coded as audio. An hour later he meets a new person at a function and inputs the person's URL which is instantly uploaded to his databank.

In a further preferred embodiment, in the data bank of his leg history for the day, all entries have a time stamp and also have a geographical place stamp because the system makes use of a GPS or other navigational system that is activated at the moment the accountholder uploads either a digital network entry 20 or a digital member entry 30 into his databank on the system.

The digital network entries 20 and the digital member entries 30 are automatically transmitted to a database located on a telecommunications network at the time of entry. "At a time of entry" means when the digital network entry 20 or the digital member entry 30 is captured by and entered into the network device 22, and preferably when these entries are entered into device 22 for the first time. When a person wants to review their digital leg history 10, they obtain access to the entire digital history for viewing by simply going to the web site of the system and accessing the database, after entry of authentication data.

A further feature of the present invention is that the digital history 10 can be updated by the person at any time by simply adding a digital network entry 20 or a digital member entry 30. In the system database 100, there is maintained separate digital leg histories 10A, 10B, 10C, 10D, etc. for each person who signed up with the system/network. However, in certain preferred embodiments serving public security and/or police functions, the system also has the ability to search the entire database 100 representing a collection of the digital leg histories of a population or of a group of individuals in a particular location, such as a zip code, state or country.

In this patent application the term "sensory images" means audio, visual, olfactory, tactile and/or taste images. The most common sensory images will be visual and the second most common will be audio. Any combination of images are also contemplated such as audio visual images. Furthermore, in this patent application, the term "proximate network device of the person" means a network device of the person that is located proximate to the network device of the member of the network, said member being different than the person (who is also a member of the network). In addition, in this context, the term "proximate" means, in one preferred embodiment and described in claim 1, within sight of one another and preferably also within a short enough range that short-range wireless communication system (purely by way of example, Bluetooth®) function properly. It is contemplated by the present invention that the term proximate can be defined differently so that it can be even closer than "within sight". For example, proximate can be defined to mean within 20 yards and within a short enough range that a short-range wireless communication system can function properly.

Preferably, digital network entries 20 and digital member entries 30 are not work files that reflect work done by a person processing data. Rather, these entries are unprocessed files capturing significant data at a certain time and place. They therefore can be said to contain "experiential" data, in the sense that the data in them relate significantly to the time in which and place at which the data therein was captured or transmitted, and thereby represent a significant experience for the person who entered them into his digital leg history. If this was not the case, the function of providing a nostalgic experience upon review of the digital leg history entries would not be effective.

FIG. 8 also shows an advertisement 333 on blank space on the leg history screen, i.e. the screen displaying the leg history 10. This is important because the leg histories will have become popular. The advertisement can end up in the leg history 10 in a number of ways. One way is that large companies approach the system owner and offer to place advertisements on digital leg history account holders having a particular profile. Preferably, the profile is a profile of the digital network entries 20 that are comprised of URLs. The content of the URLs in the leg history 10 make it more likely that the advertisement is attractive to the person whose leg history it is. "Attractive" in this context means likely to generate a positive response to the advertisement.

For example, in one embodiment a person whose leg history 10 contains a high preponderance of URLs for airline companies would be served an advertisement from an airline company. Understandably, an airline company would be more interested in having its advertisements appear on the digital history 10 of such a person than on the digital history 10 of a person without a high preponderance of airline URLs.

This requires that the URLs be categorized into topics that define business categories. The system 121 running database 100 would need to do this. One way would be for the database to search for well known names of airlines or the URLs of such airline companies throughout the database.

In an alternative embodiment, those business that have provided digital network entries to members of the network as they enter store premises, will have the right to advertise separately in a blank space on the leg history screen.

In certain embodiments, the advertisement appears whenever the member, after providing authentication data, accesses his leg history 10. In this way, advertisers have a new way of reaching potential purchasers because the leg history represents where the purchasers have been.

Using Digital Histories to Improve Search Results

Figure 9:
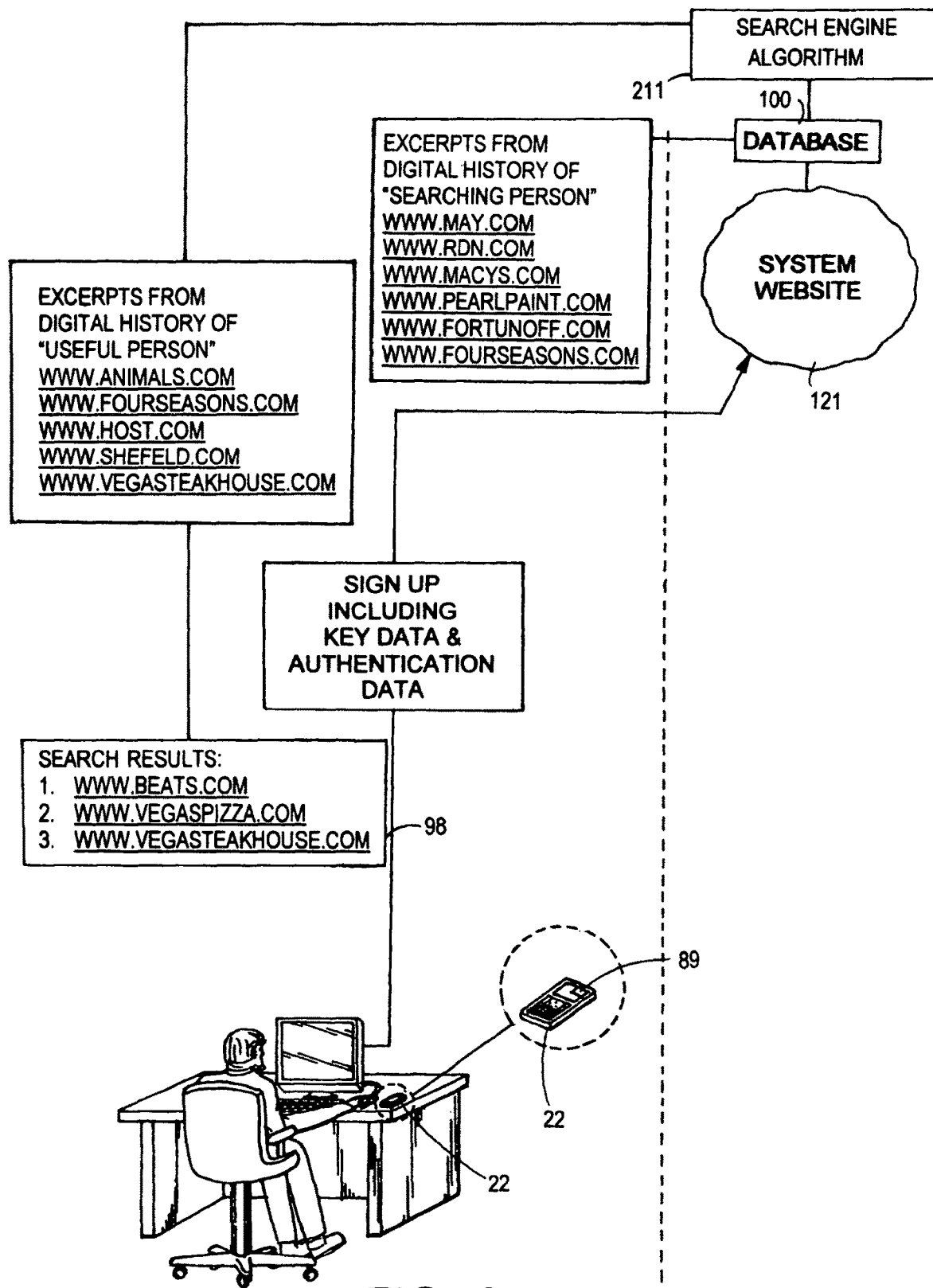
FIG. 9 shows the method of searching for businesses of a certain kind in a certain geographic area using the digital histories of the present invention to identify a "useful person" in accordance with one embodiment of the present invention.

As seen from FIG. 9 and the description herein, a new method that uses digital histories to enhance web searching results is presented. It is a method of searching the Internet or the world wide web using the digital history 10 of the present invention. Algorithms can be easily imagined by those skilled in the art of search engine algorithms that would improve searching. The search engine would be given access to the digital history 10 of the person searching and the digital leg histories of other members in the database 100. The search engine algorithm would consider the URLs in the digital history of the person doing the searching.

It is noted that when the search engine accesses the database 100 of digital histories, it only looks at the digital network entries 20 and only those that are URLs. Alternatively, it searches all digital network entries 20 and those digital network entries 20 that are not URLs have a URL associated with them. This would be because in this embodiment when a person signs up and provides key data, if the key data 15 is not a URL then the person is either given a URL by the system of provides a pre-existing URL to the system along with or as part of the key data 15. In this case, when the key data is transmitted and becomes a digital network entry 20, it has a URL associated with it even if the key data 15 is primarily text. This just means that a search engine will "find" a URL in that digital network entry 20 even though the digital network entry is a poem or text. The text or poem is what the member will see when he accesses and looks through his digital history 10.

Accordingly, with respect to these methods of using digital histories, it is emphasized that the digital history involved is understood broadly in that it may even be a digital history that only contains digital network entries. Even more broadly, it may be a digital history that only contains URLs.

A method is provided of using a digital history of a person who is a member of a network in searching a database of URLs (i.e. the world wide web, not database 100) by means of a search algorithm to improve the search result ranking. The algorithm of the search considers a plurality of factors in ranking search results of URLs known to those skilled in the art of search engine algorithms. This assignment of a degree of priority merely adds one additional factor in the collection of factors determining overall priority in the search result ranking.

As shown in FIG. 9, a use of digital histories to perform web searching involves searching for a particular kind of business, for example in a particular geographic area. Suppose a person, Mr. Smith, dines at a particular New York restaurant. Mr. Smith therefore has that restaurant's URL in his digital history. Mr. Smith is visiting or will visit Texas and needs to locate an appropriate restaurant in Dallas. The idea is that restaurants in Dallas which have been frequented by people who have also dined in the New York restaurant that Mr. Smith frequents are more appealing candidates to be a restaurant suitable for Mr. Smith. The search engine would be given access to the digital history 10 of Mr. Smith who is conducting a search on the search engine and the search engine would also have access to digital histories of others at database 100. An algorithm, which could be the search engine algorithm or else an algorithm operated by the database 100 and ultimately outputted to the search engine, could identify one or more persons (called "useful persons") who have a common restaurant URL with Mr. Smith and who also have a restaurant URL for a restaurant in Dallas, the city that Mr. Smith entered in his search. The algorithm would then assign a mathematical priority to such a restaurant. As shown in FIG. 9 the search hit ranking includes the URL in a priority position that it ordinarily would not be located at. FIG. 9 makes use of excerpts of digital histories of the "useful person" and of the "searching person" to illustrate how the method works. These excerpts may take portions of entries from different pages in the digital history 10.

Accordingly, the following method is presented. A method of using a digital history of a searching person who is a member of a network and who is searching a database of URLs for a certain kind of business in a particular geographic area by means of a search algorithm that considers a plurality of factors in ranking search results of URLs, comprising: (i) providing the search engine algorithm 211 with access to the digital histories of persons who are members of the network, (ii) searching the database of digital histories for URLs to identify a target business of said kind in the particular geographic area wherein a URL 98 of said target business appears in a digital history of a useful person who is a member of the network, the digital history of said useful person also including a URL for a second business of the same kind located in a second geographic area, wherein the searching person has in his digital history the URL of the second business, and (iv) including in the plurality of factors an assignment of priority to the URL of the target business. It is noted that geographic area need not mean a different city.

It is noted as before (in the first use of digital histories for web searching) that when the search engine accesses the database 100 of digital histories, it only looks at the digital network entries 20 and only those that are URLs. Alternatively, it searches all digital network entries 20 and those digital network entries 20 that are not URLs have a URL associated with them. This would be because in this embodiment when a person signs up and provides key data, if the key data 15 is not a URL then the person is either given a URL by the system of provides a pre-existing URL to the system along with or as part of the key data 15. When the key data is transmitted and becomes a digital network entry 20, it has a URL associated with it even if the key data 15 is primarily text.

This method requires that the URLs be categorized into topics that define business categories. Either database 100 or the search algorithm would need to do this. In this context the database 100 does not necessarily mean the actual database but rather the system web site 121 running database 100. It is believed that most search engine algorithms already do this. One possible way of doing this is for the search engine algorithm, for example, Google®, to search the words in the web site of the URL and categorize the URL into topics based on the content of the words in the web site. This would require searching the actual world wide web. Another way is for the URL to be categorized by topic by the member of the network when the URL is entered as key data into database 100. Another way for the system running database 100 to do this would be for the system 121 to search for well known names of businesses of a certain kind or the URLs of such businesses throughout the database. Alternatively, the system 121 could access and use the same method that the search engine algorithms use to categorize such businesses.

More broadly speaking, the method comprises a method wherein a searching person searches a world wide web for a certain kind of business in a particular geographic area using a search algorithm that considers a plurality of factors in ranking search results of URLs, the method comprising (i) providing the search algorithm with access to a database of URLs, said database of URLs incorporating a plurality of personal subcollections of URLs, each of said personal subcollections of URLs including URLs that were transmitted in person to persons who are members of a network and who entered the transmitted URL into a personal subcollection of the member, (ii) searching URLs in said database to identify a target business of said kind in the particular geographic area wherein a URL of said target business appears in a personal subcollection of URLs of a useful person who is a member of the network, the personal subcollection of said useful person also including a URL for a second business of the same kind located in a second geographic area, wherein the searching person has in his personal subcollection of URLs the URL of the second business, and (iii) including in the plurality of factors an assignment of priority to the URL of the target business.

The present invention further contemplates an even broader example of this method applied to web searching (the second kind of use of digital histories in web searching) that is entirely independent of geographic area. For example, a searching person who has a patent attorney and whose patent attorney's URL is listed in the searching person's digital history 10 is now searching for a real estate attorney (the target business) on the world wide web (or on a telecommunications network). There may be a useful person in database 100 of digital histories in relation to this searching person. That is, the useful person would be one who also has the same patent attorney's URL listed in their digital history 10 and who in addition has a real estate attorney whose URL is listed in the useful person's digital history 10. The searching person would trust that real estate attorney more than another real estate attorney, especially everything else being equal.

Accordingly, the following broader method is presented. A method of using a digital history of a searching person who is a member of a network and who is searching a database of URLs for a first kind of business within a particular topic by means of a search algorithm that considers a plurality of factors in ranking search results of URLs, comprising: (i) providing the search engine algorithm 21 1 with access to the digital histories of persons who are members of the network, (ii) searching through URLs in the digital histories of the database in order to identify a target business of said first kind wherein a URL 98 of said target business appears in a digital history of a useful person who is a member of the network, the digital history of said useful person also including a URL for a second business of a second kind (but within the same topic), wherein the searching person has in his digital history the URL of the second business, and (iii) including in the plurality of factors an assignment of priority to the URL of the target business. It is noted that "assignment of priority" in this case, as before, merely means that everything else being equal some degree of priority is given in the collection of factors considered y the search algorithm. This assignment of a degree of priority merely adds one additional factor in the collection of factors determining overall priority in the search result ranking. It is further noted that geographic area need not mean a different city.

Again, more broadly speaking the method is presented wherein a searching person searches a world wide web for a certain first kind of business using a search algorithm that considers a plurality of factors in ranking search results of URLs, the method comprising (i) providing the search algorithm with access to a database of URLs, said database of URLs incorporating a plurality of personal subcollections of URLs, each of said personal subcollections of URLs including URLs that were transmitted in person to persons who are members of a network and who entered the transmitted URL into a personal subcollection of the member, (ii) searching URLs in said database to identify a target business of said first kind wherein a URL of said target business appears in a personal subcollection of URLs of a useful person who is a member of the network, the personal subcollection of said useful person also including a URL for a second business of the second kind, wherein the searching person has in his personal subcollection of URLs the URL of the second business, and (iii) including in the plurality of factors an assignment of priority to the URL of the target business.

Alternatively, an even broader example would be where instead of the business of the second kind being within the same geographic area or within the same topic category (attorneys) the method can just call a useful person someone who has any other business whose URL is found in both the searching person's digital history and the useful person's digital history. However, it is believed that the trust level would be reduced. That is, while I might trust the real estate attorney selection of someone who has the same patent attorney as me, I will be somewhat less impressed with the real estate attorney selection of someone who has the same doctor or the same grocery store as me.

The search engine will preferably give also priority based on time in the following sense. We stated that a useful person in database 100 of digital histories in relation to this searching person also has the same patent attorney's URL listed in their digital history 10 and also has a real estate attorney whose URL is listed in the useful person's digital history 10. If the useful person's selection of the real estate attorney and/or patent attorney was a long time before the searching person is doing his search, it should be given less priority.

Furthermore, the frequency of useful selection may also be considered. If the useful person has even more in common with the searching person, i.e. he has two patent attorneys URLs in his digital history that are in common with the patent attorneys URLs in the searching person's digital history 10, the useful person's selection of real estate attorney is even more trusted and given more priority in the search ranking.

It can be appreciated from these examples that the method of using digital histories in web searching has countless other applications that differ from the above examples. Accordingly, these examples should be treated as merely illustrative of the concept involved. In addition, all factors used by search engine algorithms today or in the future can be used in the method of the present invention involving using digital histories to improved web searching.

In a further embodiment of the method of the present invention using digital history for enhanced web searching, all digital network entries 20 can be either a URL or would have a URL associated with it. When a person signs up and provides key data 15, the person also provides a pre-existing URL or is given a new URL by the system.

It is to be understood that while the method and apparatus of this invention have been described and illustrated in detail, the above-described embodiments are simply illustrative of the principles of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

What is claimed is:

1. A computer-implemented method for accumulation of physical location histories based on digital member entries using URL-possessing elements of a mobile web, the method comprising:

maintaining a processing system that is connected to a telecommunications network and is configured to provide an account to individual members of a member network and to store a physical location history associated with the account, each account associated with a URL or an identifier associated with the URL;

providing an application that configures a handheld mobile communication device of a particular individual member of the member network who is mobile to, upon instances of a capture by the particular individual member of a digital member entry, transmit the digital member entry to the processing system at an account associated with the URL or associated identifier of the particular individual member automatically as a result of a communication from the handheld mobile communication device of the particular individual member to the processing system, a location of each particular individual member determined by a positioning system, the particular individual member's account configured to allow the particular individual member's physical location history to be accumulated from multiple handheld mobile communication devices of the particular individual member over time;

the application maintaining a viewable, searchable physical location history on each handheld mobile communication device, including multiple digital member entries of the particular individual member, the physical location history searchable by URL or associated identifier; and maintaining, using the processing system, a database identifying, by URL or associated identifier, the particular individual members whose physical location history was accumulated, wherein the physical location history of the particular individual member includes at least one visual timeline of digital member entries of the particular individual member, wherein at least some of the digital member entries captured are of a vendor member or a second individual member, of the member network, during a physical encounter between the individual member and the vendor member or the second individual member.

2. The method of claim 1, wherein the URL or associated identifier of the particular individual member is associated with the particular individual member before the capture of the digital member.

3. The method of claim 1, wherein the URL or associated identifier of the particular individual member is associated with the particular individual member at a time the account is opened by the particular individual member.

4. The method of claim 1, wherein the digital member entry comprises one or more of (i) a visual image file, (ii) an audiovisual file, (iii) an audio file or (iv) a text file, created by the particular individual member.

5. The method of claim 1, wherein the URL or associated identifier of the particular individual member is a URL or associated identifier of a business of the particular individual member.

6. The method of claim 1, further comprising setting the account of the particular individual member so that digital member entries captured by the particular individual member are automatically transmitted to the processing system for entry into the physical location history of the particular individual member without further confirmation by the particular individual member.

7. The method of claim 1, further comprising the application allowing searching of the physical location history of the particular individual member upon the particular individual member signing in to the account at the processing system.

8. The method of claim 1, wherein the viewable, searchable physical location history on the handheld mobile communication device also includes place data for a geographic location of the capture of the digital member entry.

9. The method of claim 1, wherein the searchable physical location history on each handheld mobile communication device is searchable in a calendar format by one or more of: a calendar day, calendar month, a calendar year.

10. The method of claim 1, wherein the searchable physical location history on each handheld mobile communication device is searchable by URL or associated identifier of the vendor member of the member network that is entered when the capture occurs during a physical encounter between the particular individual member and the vendor member.

11. The method of claim 1, wherein the searchable physical location history on each handheld mobile communication device is searchable by URL or associated identifier of the second particular individual member of the member network that is entered when the capture occurs during a physical encounter between the particular individual member and the second particular individual member.

12. A system for accumulation of physical location histories based on digital member entries using URL-possessing elements of a mobile web, the system comprising:

a processing system that is connected to a telecommunications network and is configured to provide an account to individual members of a member network and to store a physical location history associated with the account, each account associated with a URL or an identifier associated with the URL;

an application configured to be downloaded onto handheld mobile communication devices of a particular individual member of the member network, the application configured to, upon instances of a capture by the particular individual member of a digital member entry, transmit the digital member entry to the processing system at an account associated with the URL or associated identifier of the particular individual member automatically as a result of a communication from the handheld mobile communication device of the particular individual member to the processing system, a location of each particular individual member determined by a positioning system, the particular individual member's account configured to allow the particular individual member's physical location history to be accumulated into a calendar format from multiple handheld mobile communication devices of the particular individual member over time;
the application configured to maintain a viewable, searchable physical location history on each handheld mobile communication device, including multiple digital member entries of the particular individual member;
the processing system including a database identifying, by URL or associated identifier, the particular individual members whose physical location history was accumulated,
wherein the physical location history of the particular individual member includes at least one visual timeline of digital member entries of the particular individual member,
wherein at least some of the digital member entries captured are of a vendor member or a second individual member, of the member network, during a physical encounter between the individual member and the vendor member or the second individual member.

13. The system of claim 12, wherein the URL or associated identifier of the particular individual member is associated with the particular individual member before the digital member entry is transmitted to the processing system.

14. The system of claim 12, wherein the URL or associated identifier of the particular individual member is associated with the particular individual member at a time the account is opened by the particular individual member.

15. The system of claim 12, wherein the digital member entry comprises one or more of (i) a visual image file, (ii) an audiovisual file, (iii) an audio file or (iv) a text file, created by the particular individual member.

16. The system of claim 12, wherein the URL or associated identifier of the particular individual member is a URL or associated identifier of a business of the particular individual member.

17. The system of claim 12, wherein the account of the particular individual member is set so that digital member entries captured by the particular individual member are automatically transmitted to the processing system for entry into the physical location history of the particular individual member without further confirmation by the particular individual member.

18. The system of claim 12, wherein the application allows searching of the physical location history of the particular individual member upon the particular individual member signing in to the account at the processing system.

19. The system of claim 12, wherein the viewable, searchable physical location history on the handheld mobile communication device also includes place data for a geographic location of the capture of the digital member entry.

20. The system of claim 12, wherein the searchable physical location history on each handheld mobile communication device is searchable in the calendar format by one or more of: a calendar day, calendar month, a calendar year.

21. The system of claim 12, wherein the searchable physical location history on each handheld mobile communication device is searchable by URL or associated identifier of a vendor member of the member network that is entered when the capture occurs during a physical encounter between the particular individual member and the vendor member.

22. The system of claim 12, wherein the searchable physical location history on each handheld mobile communication device is searchable by URL or associated identifier of a second particular individual member of the member network that is entered when the capture occurs during a physical encounter between the particular individual member and the second particular individual member.

23. A non-transitory computer-readable medium having stored thereon an application executable by one or more hardware processors, the execution performing:
providing an account to each individual member of a member network, each account associated with at least one URL or an identifier associated with the URL and storing a physical location history associated with the account;
configuring a handheld mobile communication device that is in communication with a positioning system and a processing system to, upon instances of a capture by a particular individual member of a digital member entry, transmit the digital member entry to the processing system at an account associated with the URL or associated identifier of the particular individual member automatically as a result of a communication from the handheld mobile communication device of the particular individual member to the processing system, a location of each particular individual member determined by a positioning system, the particular individual member's account configured to allow the particular individual member's physical location history to be accumulated into a calendar format from multiple handheld mobile communication devices of the particular individual member over time;
maintaining a viewable physical location history on each handheld mobile communication device that is searchable in the calendar format by one or more of: a calendar day, calendar month, a calendar year, and including multiple digital member entries of the particular individual member; and
maintaining, using the processing system, a database identifying, by URL or associated identifier, the particular individual members whose physical location history was accumulated,
wherein the physical location history of the particular individual member includes at least one visual timeline of digital member entries of the particular individual member,
wherein at least some of the digital member entries captured are of a vendor member or a second individual member, of the member network, during a physical encounter between the individual member and the vendor member or the second individual member.

24. The computer-readable medium of claim 23, wherein the digital member entry comprises one or more of (i) a visual image file, (ii) an audiovisual file, (iii) an audio file or (iv) a text file, created by the particular individual member.

25. The computer-readable medium of claim 23, wherein the URL or associated identifier of the particular individual member is a URL or associated identifier of a business of the particular individual member.

26. The computer-readable medium of claim 23, wherein the account of the particular individual member is set so that digital member entries captured by the particular individual member are automatically transmitted to the processing system for entry into the physical location history of the particular individual member without further confirmation by the particular individual member.

27. The computer-readable medium of claim 23, wherein the viewable physical location history on the handheld mobile communication device also includes place data for a geographic location of the capture of the digital member entry.

28. The computer-readable medium of claim 23, wherein the physical location history on each handheld mobile communication device is searchable by URL or associated identifier of a vendor member of the member network that is entered when the capture occurs during a physical encounter between the particular individual member and the vendor member.

29. The computer-readable medium of claim 23, wherein the physical location history on each handheld mobile communication device is searchable by URL or associated identifier of a second particular individual member of the member network that is entered when the capture occurs during a physical encounter between the particular individual member and the second particular individual member.

* * * * *